United States Patent
Filipovich et al.

(10) Patent No.: US 7,791,809 B2
(45) Date of Patent: Sep. 7, 2010

(54) VISOR HEADS-UP DISPLAY

(75) Inventors: Danny Filipovich, Lincolnwood, IL (US); Jack Fiore, Inverness, IL (US); Eric Ford, Shadow Hills, CA (US)

(73) Assignee: Day and Night Display Systems, Inc., Lincolnwood, IL (US)

( * ) Notice: Subject to any disclaimer, the term of this patent is extended or adjusted under 35 U.S.C. 154(b) by 0 days.

(21) Appl. No.: 12/404,087

(22) Filed: Mar. 13, 2009

(65) Prior Publication Data

US 2009/0231722 A1  Sep. 17, 2009

Related U.S. Application Data

(60) Provisional application No. 61/036,281, filed on Mar. 13, 2008.

(51) Int. Cl.
*G02B 27/14* (2006.01)

(52) U.S. Cl. ...................... 359/631; 359/630

(58) Field of Classification Search ............ 359/19, 359/630–633
See application file for complete search history.

(56) References Cited

U.S. PATENT DOCUMENTS

| | | | |
|---|---|---|---|
| 4,000,419 A | 12/1976 | Crost et al. | |
| 4,266,848 A | 5/1981 | Schlegel | |
| 4,468,101 A | 8/1984 | Ellis | |
| 4,653,879 A | 3/1987 | Filipovidh | |
| 4,689,834 A | 9/1987 | McCarthy et al. | |
| 4,915,487 A | 4/1990 | Riddell, III et al. | |
| 5,079,416 A | 1/1992 | Filipovich | |
| 5,229,598 A | 7/1993 | Filipovich | |
| 5,341,242 A * | 8/1994 | Gilboa et al. | 359/631 |
| 5,416,876 A * | 5/1995 | Ansley et al. | 385/116 |
| 5,506,728 A * | 4/1996 | Edwards et al. | 359/629 |
| 5,654,828 A * | 8/1997 | Togino et al. | 359/633 |
| 6,198,090 B1 | 3/2001 | Iosue | |
| 6,560,029 B1 | 5/2003 | Dobbie et al. | |
| 6,765,729 B2 * | 7/2004 | Perrin et al. | 359/727 |

* cited by examiner

*Primary Examiner*—Joseph Martinez
*Assistant Examiner*—James R Greece
(74) *Attorney, Agent, or Firm*—Matthew R. Schantz; Daniel L Boots; Bingham McHale LLP

(57) ABSTRACT

A wearable system is shown that presents one or more heads-up displays to the wearer. A data source provides information to an image generator that is sufficient to generate one or more display images, which are still or moving, characters or graphical displays. The output image from the image generator passes through a lens, reflects off a curved mirror, and passes back through the lens the other way. The image then passes through two non-doublet lenses, between which an intermediate image exists. The image reflects off the "lens," or visor, of the glasses and proceeds to the pupil of the wearer's eye. Alternative embodiments use a helmet visor, mirror, or other (at least partially) reflective surface for the final reflection.

15 Claims, 5 Drawing Sheets

VISOR HEADS-UP DISPLAY

FIELD

Some embodiments disclosed herein relate to optical systems and elements, and in particular to an optical system having a heads-up display (HUD).

DESCRIPTION

For the purpose of promoting an understanding of the principles of the invention, reference will now be made to certain embodiments illustrated in the disclosure, and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

HUDs designed for military use often fail to provide qualities desirable or essential for civilian use. For example, the bulk, weight, and expense associated with many military HUDs prevent those designs from penetrating civilian and especially entertainment markets.

The present invention enables HUD systems to be designed that are smaller and lighter than many previous military designs. Various embodiments fit normal-sized glasses, provide enhanced images, produce a field-of-view up to 35° (diagonal), and interface with many portable electronic devices.

Figure 1:
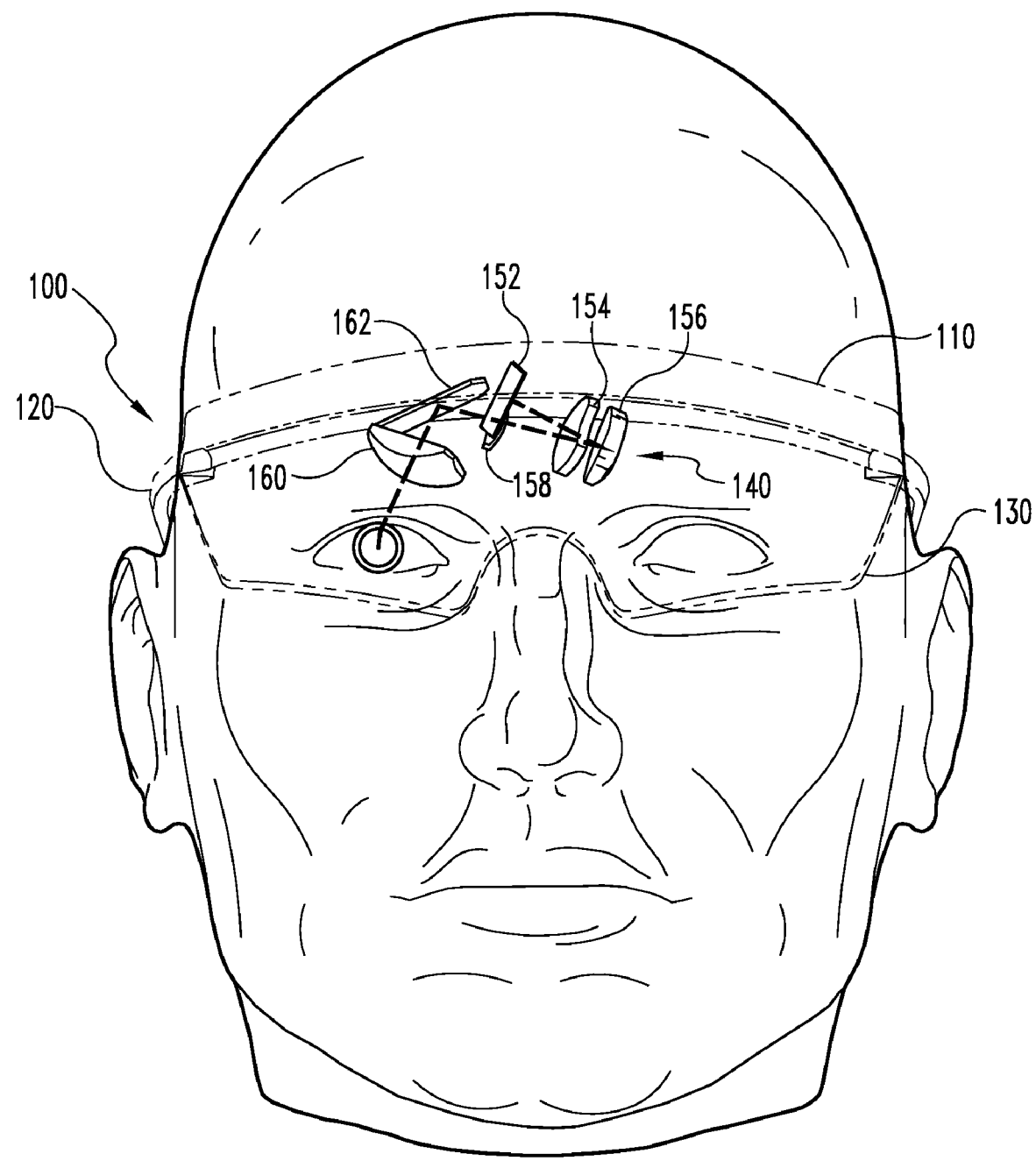
FIG. 1 is a front view of monocular head-up display (HUD) glasses according to one embodiment.
Figure 2:
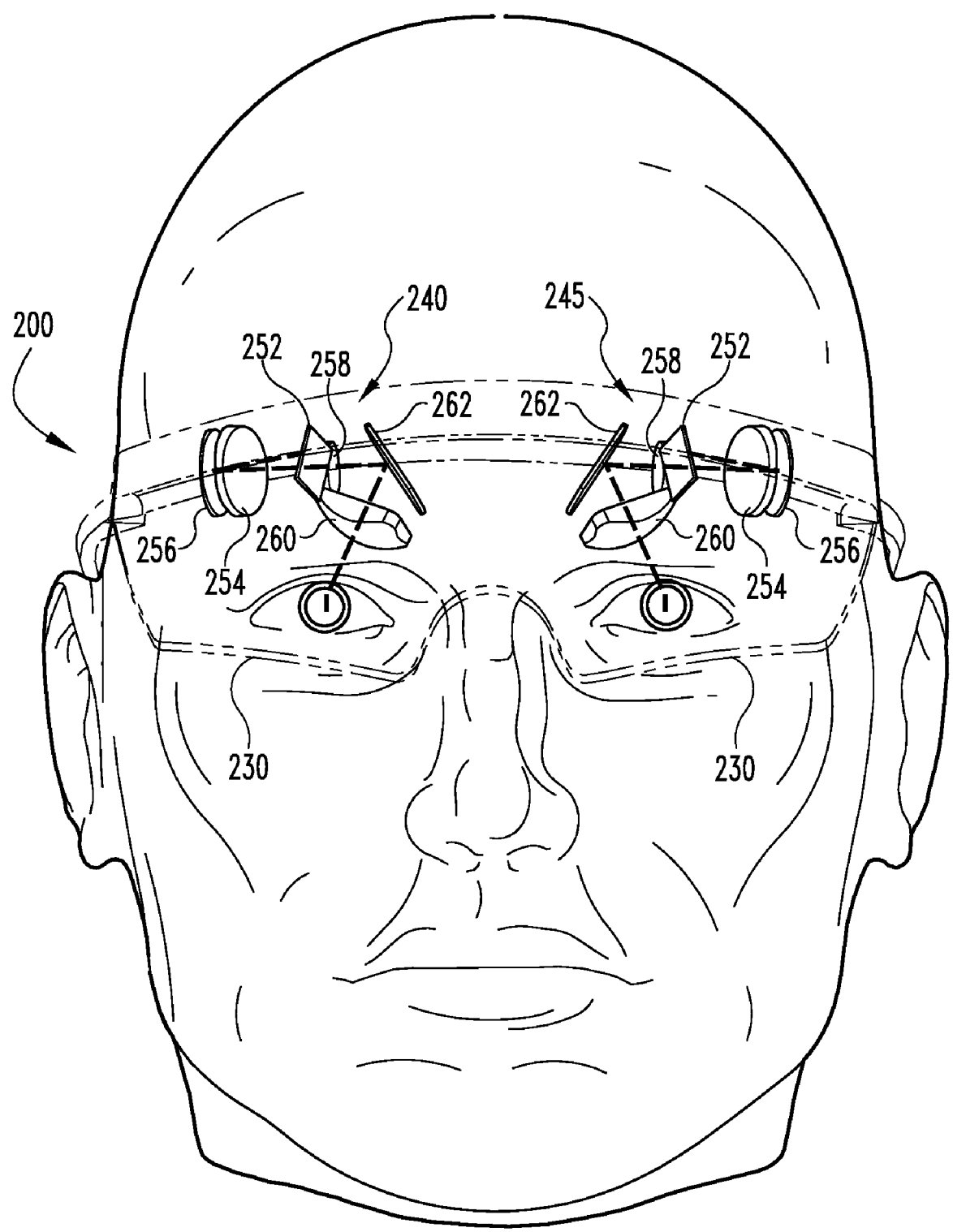
FIG. 2 is a front view of binocular HUD glasses according to a second embodiment.

Generally, a visor HUD according to some embodiments disclosed herein is illustrated in FIG. 1, while another is shown in FIG. 2. These visor embodiments are in the form of wrap-around glasses, though helmet-based forms, mirror-based forms, and other forms will occur to those skilled in the art in light of the present disclosure. For clarity, the word "visor" will be used to refer to the object that is within the view of the wearer, and off which the generated image(s) reflect(s), though that object might just as well be a lens, mirror, or other (at least partially reflective) object, whether or not the word "visor" would typically be used to describe it.

Turning to FIG. 1, monocular HUD glasses 100 include frame 110, stems 120, and a visor 130 as are customary or desirable. Optical system 140 generates a display image visible to one eye of the wearer on the surface of the visor 130. In various embodiments this display image includes data and/or images relevant to the user or his or her activities. In some embodiments, the display image relates to a game, e-mail or movie images, while in others it reflects physiological data (such as heart rate, blood pressure, or other data) to the wearer, driving and navigation data, or other information as will occur to those skilled in the art.

A second embodiment as shown in FIG. 2 is binocular HUD glasses that include a pair of optical systems 240 and 245, each one providing an image to one of the user's eyes. In addition to the displays discussed above in relation to FIG. 1, in various embodiments, these optical systems display data, images, stereoscopic images, and/or 3-D images as will occur to those skilled in the art.

Figure 3:
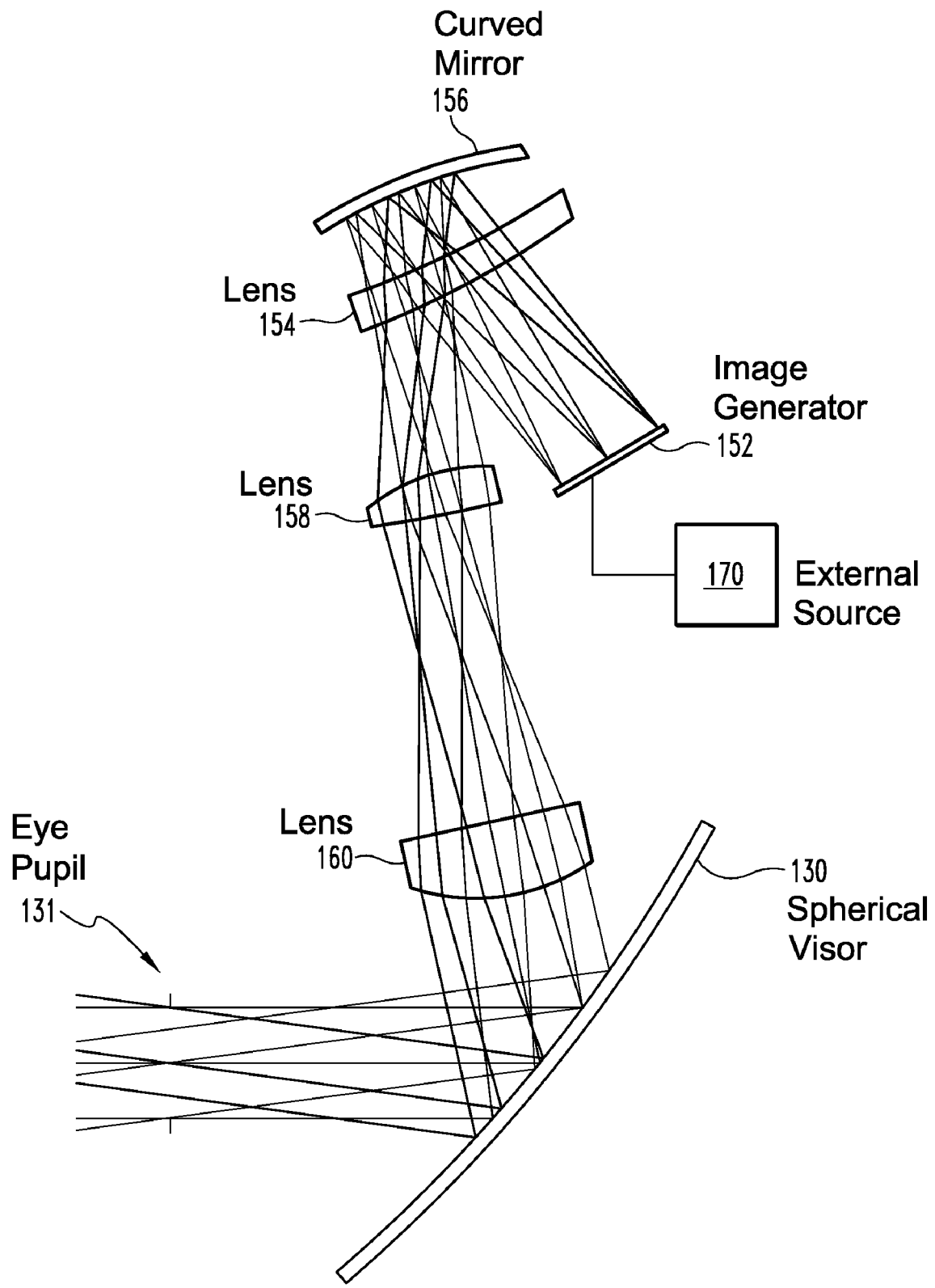
FIG. 3 is a schematic view of the optical path through the optical system in the embodiment of FIG. 1, unfolded at the planar fold mirror for clarity.
Figure 4:
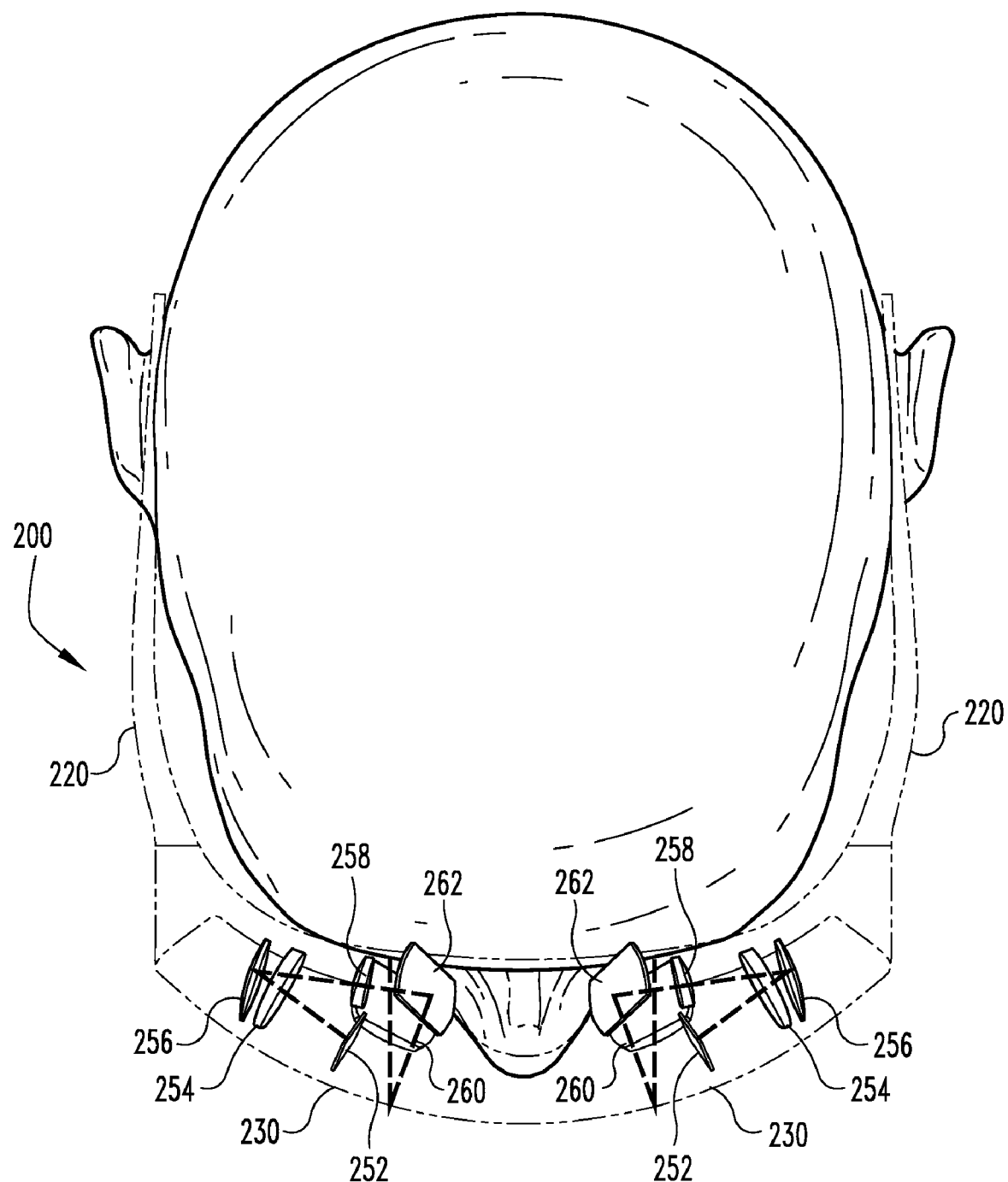
FIG. 4 is a top view of the embodiment of FIG. 2.

FIG. 3 provides a schematic view of the optical path for one of optical systems 140, 240, or 245 shown in FIGS. 1 and 2, which function in a substantially similar manner. For clarity, the fold produced by planar mirror 162 has been removed from the optical path in this view. In this illustrated embodiment, a data source 170 provides information to image generator 152 with which to generate an image for the heads-up display. The image generator 152 can be an OLED or LCD-type display, though other display generators and technologies can be used in this system as will occur to those skilled in the art.

The display produced by the image generator 152 passes through lens 154, a thin, plastic, meniscus-type "corrector" lens, both before and after it is reflected off a curved (e.g., spherical, aspheric, hyperbolic, elliptical, parabolic, or toroid) mirror 156. In one embodiment, this combination of the spherical mirror 156 and cylindrical lens 154 corrects for the astigmatism and distortion that is caused by the spherical visor reflector 130. The mirror 156 in this embodiment is preferably a spherical front surface mirror, but can also be a rear surface mirror so as to act as a Mangin mirror. It can be made of any suitable material, even plastic. Lens 158 is matched with lens 160 and lens 154 to place and collimate the image at the pupil 131 of the user's eye. Lenses 160, 158, and 154 are plastic meniscus lenses in this embodiment, and an intermediate image appears between lens 160 and lens 158. The various lenses and mirrors of the system can be made of glass, plastic, or any other suitable material. Employing a combination of different plastics for the various lenses and mirrors provides good achromatization of the system, reducing the need for bulkier, heavier glass-type achromats.

Finally, the image reflects off the visor 130 of the HUD glasses and to the pupil 131 of the observer. The visor 130 in this embodiment is spherical, though in other embodiments it can be aspheric, parabolic, or toroidal in shape, or still another shape as will occur to those skilled in the art. Further, the visor 130 in this embodiment normally has uniform reflectivity, partial reflectivity, or reflectivity that varies vertically as in the lenses of some conventional sunglasses. The design with a spherical visor is more flexible and less sensitive to minor variations in manufacturing than some other designs.

In this embodiment, image generator 152 is preferably OLED type SVGA Microdisplay from eMagin. Other embodiments might use LCD type SVGA Display from Kopin or a similar source. Either of these displays can be used in monochrome or full-color modes. However, the OLED type display is preferred in this exemplary embodiment because of higher brightness and lower power consumption.

Lenses 154 and 160 are preferably made of a light plastic material, such as acrylic or polycarbonate, though other lens materials can be used as will occur to those skilled in the art. Likewise, mirror 156 may be spherical, aspheric, parabolic, toroidal, or another shape to form a suitable combination with lens 154 and the rest of the system. In various embodiments, mirror 156 is made of plastic, glass, metal, or other materials as will appear to those skilled in the art. Mirrors 156 and 162 may even be made using a replication process.

Lens 158 is preferably a polystyrene or polycarbonate type of plastic. Some of these plastic materials are made/distributed by companies such as General Electric. Other lenses may be used in other embodiments, as will occur to those skilled in the art.

Visor 130 is also preferably plastic and in various embodiments is tinted, untinted, treated with variable and/or light-sensitive dynamic tinting, or coated with a thin film reflection coating on one side. This thin film could be applied to a whole side, or to just a patch. The visor 130 is preferably made of polycarbonate plastic or another shatterproof material for improved eye safety, and is attached to the frame 110 using any of a variety of means that will occur to those skilled in the art.

The glasses shown in FIG. 2 include a pair of optical systems 240, 245 that each provide a HUD image to one of the user's eyes. Each optical system includes an image generator 252, lens 254, mirror 256, lens 258, mirror 262, and lens 260, and again reflects the generated HUD image off visor 230.

To review, the embodiment shown in FIG. 1 is a HUD optical system 140 that uses a lens 154 that is aligned with the optical path, and through which the display image passes twice (once before reflection off a curved mirror 156, and once after reflection). Further, the disclosure herein shows a HUD display system that uses two non-doublet lenses 158 and 160, in combination with lens 154, wherein an intermediate image in the system is generated between lenses 158 and 160.

Figure 5:
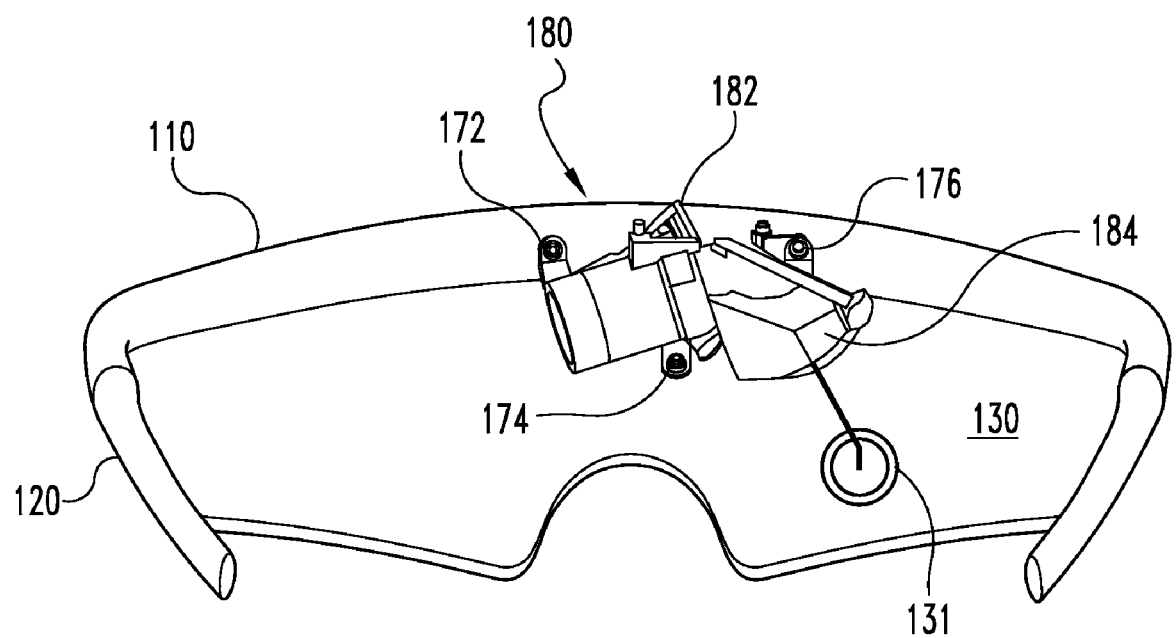
FIG. 5 shows a rear view of monocular HUD glasses with optical lenses and mirrors enclosed in mechanical housings according to the embodiment of FIG. 1.

Turning to FIG. 5, this embodiment shows optical assembly 180 attached to frame 110 with attachment features 172, 174, and 176. In various other embodiments, these features may vary in number and location, and use screws, welded joints, molded post attachments, and other methods of attachment that will occur to those skilled in the art to support optical assembly 180 in a particular relative position to visor 130 of glasses 100. As shown in FIG. 5, the optical assembly 180 is comprised of a plastic housing, all lenses and mirrors, and an image generator 152. Generator portion 182 of optical assembly 180 in this embodiment includes image generator 152 (which generates its output toward the left in this view), lens 154, and mirror 156, as discussed elsewhere herein. Output portion 184 of optical assembly 180 includes lenses 158 and 160, and folding mirror 162. The output image from output portion 184 reflects off a visor 130 to a pupil 131 of a user.

The data used to create the dynamic display of information, images, and/or video that appears on the displays in various embodiments is dynamically supplied to the first image generator by data source 170 in various ways in different embodiments, as will occur to those skilled in the art. For example, data may be displayed in character form, showing the user symbology, graphics or video images, or any combination thereof. This data may be provided to image generator 152 by external devices such as sensors (for example, GPS or biometric, etc.) or smartphones (for example, images or media). Similarly, still and moving graphics can be produced by video games, portable media players, and the like, and communicated to image generator 152 via wired and/or wireless data transfer techniques (including, for example, Wi-Fi, Bluetooth, Wi-Max, and the like) as will occur to those skilled in the art.

While the inventions have been illustrated and described in detail in the drawings and foregoing description, the same is to be considered as illustrative and not restrictive in character, it being understood that the preferred embodiment has been shown and described and that changes and modifications that come within the spirit of the invention are desired to be protected.

What is claimed is:

1. A heads-up display system for wearing by a user, comprising:
   a first image generator that generates a first output image;
   a first lens;
   a first curved mirror;
   a first visor having a curved reflective surface; and
   a second lens and a third lens,
   wherein the first image generator, first lens, first curved mirror, second lens, third lens, and first visor are fixed in relative positions so that
      the first output image passes through the first lens, reflects off the first curved mirror, passes through the first lens again, passes through the second lens and third lenses, and reflects off the reflective surface of the first visor into a first eye of the user; and
      an intermediate image appears between the second lens and the third lens.

2. The system of claim 1, wherein the first lens is a meniscus lens.

3. The system of claim 1, wherein the first visor is a lens of a pair of glasses.

4. The system of claim 1, further comprising:
   a second image generator that generates a second output image;
   a fourth lens, fifth lens, and sixth lens;
   a second curved mirror; and
   a second visor having a curved reflective surface;
   wherein the second image generator, fourth lens, fifth lens, sixth lens, second curved mirror, and second visor are fixed in relative positions so that the second output image passes through the fourth lens, reflects off the second curved mirror, passes through the fourth lens again, passes through the fifth lens and sixth lens, and reflects off the reflective surface of the second visor into a second eye of the user; and
   wherein an intermediate image appears between the fifth lens and sixth lens.

5. The system of claim 4,
   further comprising a first flat folding mirror and a second flat folding mirror; and
   wherein the first flat folding mirror reflects the first output image between the second and third lenses; and
   wherein the second flat folding mirror reflects the second output image between the fifth and sixth lenses.

6. The system of claim 4, wherein
   the first visor is a lens of a pair of glasses, and
   the second visor is a lens of the pair of glasses.

7. The system of claim 6, wherein the first visor and the second visor are different lenses of the same pair of glasses.

8. The system of claim 6, wherein the first visor and the second visor are the same lens of a pair of glasses.

9. The system of claim 1, wherein the first mirror is selected from the mirror type class consisting of:
   a toroidal mirror,
   an aspheric mirror,
   a hyperbolic mirror,
   an elliptical mirror,
   a parabolic mirror, and
   a spherical mirror.

10. The system of claim 1, further comprising a data source that dynamically supplies the first image generator with information sufficient to generate a dynamic display of data to the user.

11. The system of claim 10, wherein the data source is a portable media player.

12. The system of claim 1,
further comprising a first flat folding mirror; and
wherein the first flat folding mirror reflects the first output image between the second and third lenses.

13. The system of claim 1, further comprising a frame that fixes the first image generator, first lens, first curved mirror, second lens, third lens, and first visor in their relative positions.

14. The system of claim 1, wherein the first lens is a cylindrical lens.

15. The system of claim 4, wherein the first lens and the fourth lens are cylindrical lenses.

* * * * *

UNITED STATES PATENT AND TRADEMARK OFFICE
CERTIFICATE OF CORRECTION

PATENT NO. : 7,791,809 B2
APPLICATION NO. : 12/404087
DATED : September 7, 2010
INVENTOR(S) : Danny Filipovich et al.

It is certified that error appears in the above-identified patent and that said Letters Patent is hereby corrected as shown below:

Title Page, correct Item (75) Inventors, to read:

-- Danny Filipovich, Lincolnwood, IL (US); Jack Fiore, Inverness, IL (US); Eric Ford, Shadow Hills, CA (US); Asaf Ashekanazi, Zinchron Yaakov (IL) --.

Signed and Sealed this
Thirteenth Day of January, 2015

Michelle K. Lee
*Deputy Director of the United States Patent and Trademark Office*